US012659219B2

(12) United States Patent
Haynes et al.

(10) Patent No.:    US 12,659,219 B2
(45) Date of Patent:       Jun. 16, 2026

(54) CELLULAR NETWORK OPTIMIZED FOR DATA COMMUNICATION IN ACCORDANCE WITH A SET OF PARAMETERS

(71) Applicant: Verizon Patent and Licensing Inc., Basking Ridge, NJ (US)

(72) Inventors: Thomas W. Haynes, San Ramon, CA (US); Diana Tatem, Cape May, NJ (US); Hao Wang, Morris Plains, NJ (US); Jin Yang, Orinda, CA (US); Mamta Sodikumar, Andover, MA (US); Samita Chakrabarti, Bedminster, NJ (US); Jose M. Verger, Alamo, CA (US); Kiritkumar Joshi, Cupertino, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 383 days.

(21) Appl. No.: 18/235,222

(22) Filed: Aug. 17, 2023

(65) Prior Publication Data

US 2025/0062950 A1       Feb. 20, 2025

(51) Int. Cl.
H04L 41/06          (2022.01)
H04W 24/02          (2009.01)
(52) U.S. Cl.
CPC ............. H04L 41/06 (2013.01); H04W 24/02 (2013.01)
(58) Field of Classification Search
CPC ............................... H04L 41/06; H04W 24/02
See application file for complete search history.

(56) References Cited

U.S. PATENT DOCUMENTS

| | | | | |
|---|---|---|---|---|
| 11,289,907 | B1 * | 3/2022 | Wells ........................ | H02J 3/28 |
| 2006/0103504 | A1 * | 5/2006 | Vassallo ................. | G06Q 10/06 |
| | | | | 340/5.92 |
| 2017/0149734 | A1 * | 5/2017 | Wallace ................. | H04L 63/205 |
| 2020/0212709 | A1 * | 7/2020 | de Callafon .......... | H02J 3/0012 |
| 2020/0359440 | A1 * | 11/2020 | Qiao ...................... | H04W 76/11 |
| 2021/0399545 | A1 * | 12/2021 | Naidu ................... | G01R 31/085 |
| 2023/0232229 | A1 * | 7/2023 | Raghavachari ....... | H04W 12/08 |
| | | | | 726/1 |
| 2024/0357481 | A1 * | 10/2024 | Hua ........................ | H04W 76/10 |
| 2025/0106678 | A1 * | 3/2025 | Sachs .................... | H04W 76/12 |

* cited by examiner

*Primary Examiner* — Abdullahi E Salad

(57)       ABSTRACT

An illustrative cellular network optimized for data communication in accordance with a set of parameters is described herein. The cellular network may receive a data communication that is to be delivered, in accordance with a set of parameters, from a first communication device to a second communication device. A particular user plane function (UPF) node may process the data communication in accordance with the set of parameters. The particular UPF node may be included in a set of UPF nodes deployed at sites including an edge site associated with a cellular base station and a central site associated with a network core. Based on the processing by the particular UPF node, the cellular network may deliver the data communication from the first communication device to the second communication device in accordance with the set of parameters. Corresponding methods and systems are also disclosed.

20 Claims, 9 Drawing Sheets

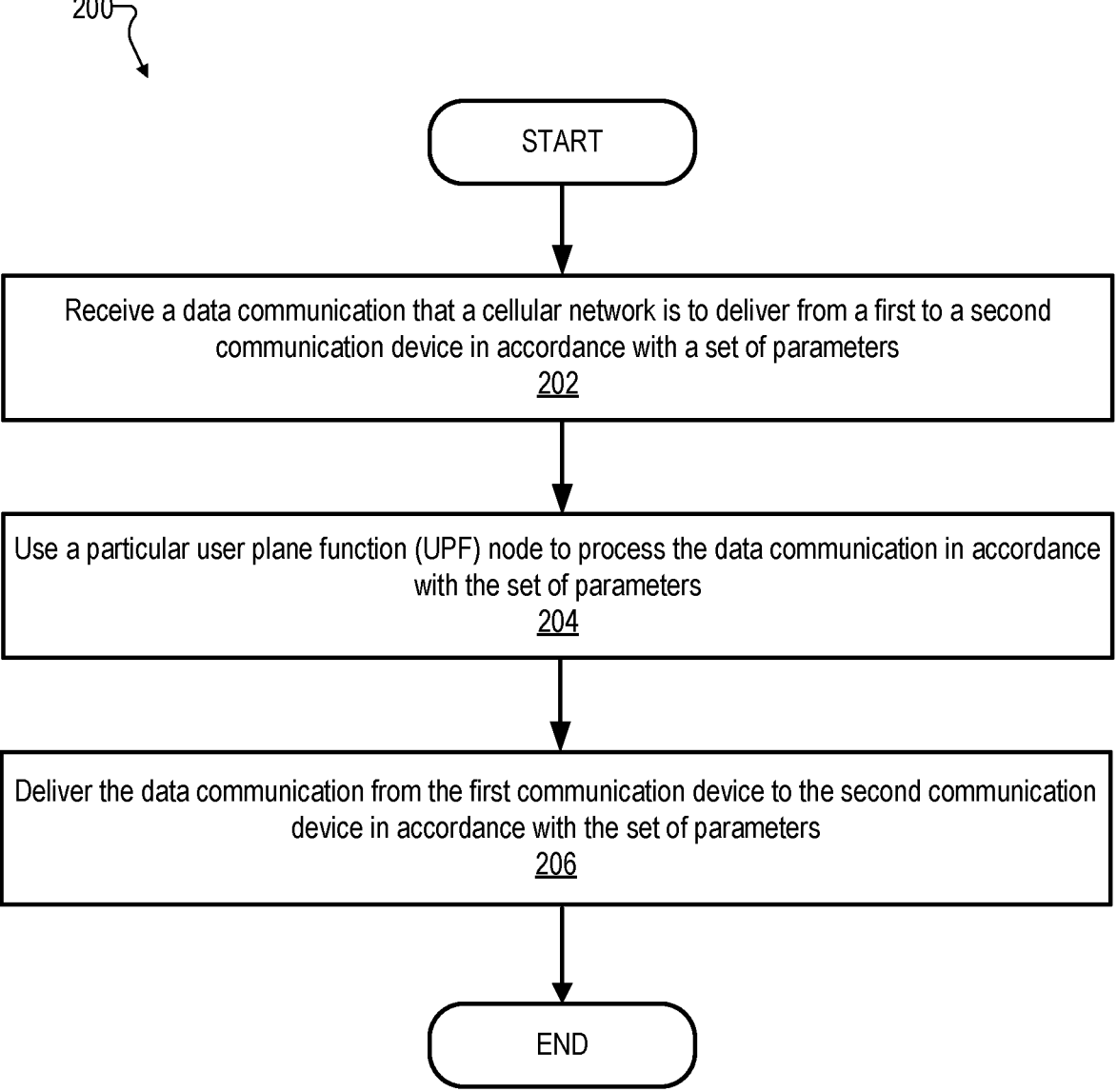

200

START

Receive a data communication that a cellular network is to deliver from a first to a second communication device in accordance with a set of parameters
202

Use a particular user plane function (UPF) node to process the data communication in accordance with the set of parameters
204

Deliver the data communication from the first communication device to the second communication device in accordance with the set of parameters
206

END

Fig. 2

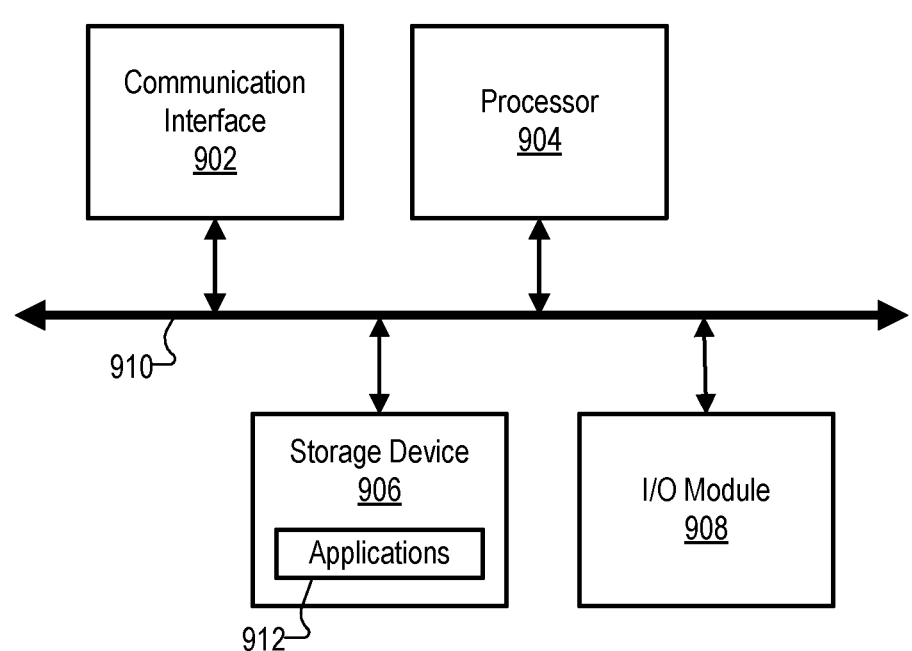
Fig. 9

CELLULAR NETWORK OPTIMIZED FOR DATA COMMUNICATION IN ACCORDANCE WITH A SET OF PARAMETERS

BACKGROUND INFORMATION

Networks are used to exchange information between communication devices employed in a variety of use cases and applications. Depending on the use case or application, the parameters desired or required for network communications may change. For example, different networking applications may have different needs and/or tolerances for how much data is to be moved at once (e.g., network throughput), how quickly data is to travel through the network from a transmitter to a receiver (e.g., network latency), what quality of service the network is to provide in terms of delivering data flawlessly and without the introduction of errors (e.g., network reliability), and so forth. A set of parameters associated with a particular data communication and/or with a particular use case or networking application may be defined to indicate what requirements, targets, tolerances, etc., the communication or use case has (e.g., how much throughput is needed, how much latency delay can be tolerated, etc.), as well as what network or other characteristics may contribute to whether these requirements and targets can be achieved (e.g., where devices are located with respect to network components, etc.). Networks that are adaptable to achieve objectives set forth by different sets of such parameters help enable requirements and tolerances of different communications and use cases to be satisfied effectively, efficiently, and consistently.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 2 shows an illustrative method performed by a cellular network optimized for data communication in accordance with a set of parameters based on principles described herein.

FIG. 9 shows an illustrative computing system that may implement any of the computing systems described herein, including those employed as part of cellular networks optimized for data communication in accordance with a set of parameters.

DETAILED DESCRIPTION OF EXAMPLE EMBODIMENTS

Figure 1:
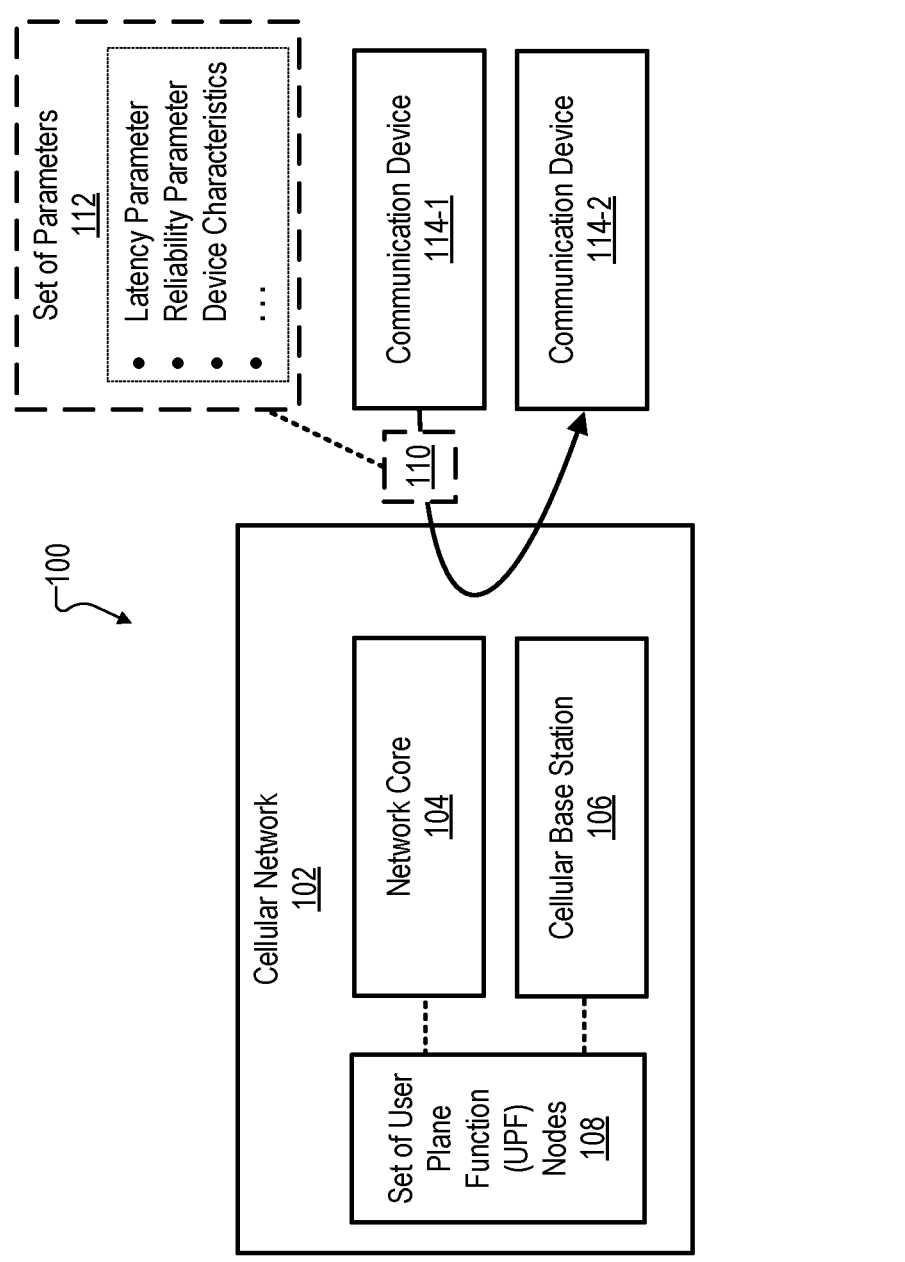
FIG. 1 shows a block diagram for an illustrative cellular network that may be optimized for data communication in accordance with a set of parameters based on principles described herein.

Cellular networks optimized for data communication in accordance with a set of parameters are described herein. As set forth above, it may be desirable for networks to be adaptable to achieve objectives set forth by different parameters so that requirements and tolerances associated with different types of communications and network applications can be satisfied effectively, efficiently, and consistently. As one example of a network application that would benefit from flexibility offered by this type of adaptable network, a power utility application will be referenced herein. This power utility use case provides a useful example of how principles described herein may be applied to real-world networking applications and, as such, will be referred to throughout the following description. However, it will be understood that principles and teachings herein should not be construed as being limited to power utility applications or to any other particular use case. Rather, as will be made apparent, cellular networks optimized for data communication in accordance with a set of parameters may be useful in a variety of different applications, use cases, and circumstances.

A primary objective of a power utility company may be to deliver reliable, economic, safe, and clean electric power to customers by way of a modern and sustainable electric grid that the power utility company creates and manages. To this end, the utility company may need to take into account various considerations in operating an electric power service, including, for example, grid modernization (e.g., developing new technologies and solutions to modernize electric grids such as by employ smart grids, distributed energy resources, energy storage, etc.), clean energy (e.g., developing new technologies to help the power sector transition to more renewable forms of energy, as well as to promote energy efficiency, carbon capture, energy storage, etc.), safety and reliability (improving the safety and reliability of the electric grid by preventing and mitigating outages, improving the resilience of the grid to natural disasters, etc.), economics (ensuring that the electric grid is economically sustainable by reducing costs of electricity and increasing value of electricity to consumers), and so forth.

One way that data networking may play into the power utility company's pursuit of these objectives involves quickly distributing fault information to various devices disposed throughout a power network or along a particular power circuit on the grid. The increasing penetrations of distributed energy resources (DER) requires new protection and control algorithms, and new DER integration methods to maintain stability, reliability, and resiliency in the modern grid. These algorithms rely on real-time data from grid devices to provide actionable insight to make quick operational decisions during fault events. When some type of problem (referred to herein as a "fault" or "electrical fault") is detected on one part of an electric power circuit, the safety of various people and equipment may depend on how fast information about the problem can be disseminated to other affected parts of the grid. An immediate response and quick resolution to such a fault detection may also lead to the most efficient and reliable power distribution. Accordingly, an established technology referred to as Direct Transfer Trip ("DTT") may be utilized in many situations to exchange information about power faults on the order of a few milliseconds or less. DTT systems are installed for critical high-speed deenergizing of electrical connections, for example, on either side of a feeder interconnecting substations, or between the substation and a distributed generation (DG) site's station equipment. By causing deenergizing through the operation of a circuit breaker, recloser, fuse, or other switching element, non-impacted grid subsystems can be isolated (e.g., establishing an "islanded" subsystem) and prevent imbalances from damaging grid components.

Latency low enough to support DTT systems has been virtually impossible to achieve with conventional wireless networking technologies and architectures. DTT protocols have conventionally relied on direct wired (e.g., copper twisted-pair, fiber optic) connections between devices (e.g., between DTT controller devices installed at different parts of the circuit and networked together on a wired network). Running cables and maintaining wired networks of this kind, however, is burdensome for utility companies to do. Installing wired networks takes time and requires access to rights-of-way, which limit the places in the grid where it can be used. Additionally, wired networks are vulnerable to disruption due to cable cuts or degradation. As such, these can limit the effectiveness of DTT, and prevent the use of improved power generation and transmission technologies that require improved fault detection.

These disadvantages of the conventional wired networking system may motivate utility providers to implement the DTT technology using wireless technology, but for this to be possible, various parameters, including low latency provided by direct fiber connections, must be accounted for and satisfied by any wireless solution that is to replace the wired networking system. Fortunately, as will be described in detail herein, cellular networks configured in accordance with principles described herein may indeed be optimized to provide the flexibility and to comport with the parameters that a networking application like this may have. For example, by leveraging modern cellular networks (e.g., 5G networks) configured to strategically place routing and processing functionality (e.g., user plane function (UPF) and/or multi-access edge compute (MEC) nodes) near the edge of the cellular network in proximity to the DTT controller devices, networking methods and systems described herein may provide a way for the DTT technology relied on by power utility companies to migrate from the present wired approaches to a wireless, cellular-based approach in which latency, reliability, and/or other parameters that the application requires are still accounted for and satisfied. At the same time, for other types of communications that do not require the same tight restrictions (e.g., communications associated with different sets of parameters that may, for example, represent wider latency tolerances and so forth), optimized cellular networks described herein may be configured to transport these communications in ways that optimize networking efficiency and economy, without necessarily aiming to meet restrictive parameters when it is not necessary.

One specific example of a network optimized in accordance with principles described herein may be implemented by a 5G network (e.g. a 5G standalone (SA) network) that utilizes UPF and/or MEC nodes that are deployed to an edge of the network, such as to a base station (e.g., gNodeB) to which both a receiver device and a transmitter device are connected. For instance, if the receiver and transmitter devices are both DTT controller devices on the same network and they are relatively proximate to one another and to the base station, the 5G SA network may use a UPF that is deployed to the base station used by the devices so that a communication sent by the transmitter device to the receiver device need not propagate through the network to a centralized location for routing and/or other user plane functions. In this way, a reliable and low-latency link between the DTT controller devices may be established so that, if a fault condition should be detected on the grid, information about the fault condition may be disseminated within approximately a millisecond (or whatever the parameters may dictate in a particular implementation) so that immediate action may be taken (e.g., a breaker may be tripped or another such response may be initiated to keep personnel and network equipment safe). At the same time, if communication of this information is able to tolerate more latency enroute to other destinations (e.g., enroute to a centralized hub of the power network where a notification system logs the fault in a manner that can tolerate up to a full second or more of latency), a different link may be established that uses a more centralized UPF or a UPF that is localized to the receiving device. Each of these scenarios will be illustrated and described in more detail below.

In some examples, the configuration of the network to be optimized to different sets of parameters associated with different data communications being exchanged for different purposes may be performed dynamically and/or when the network is set up and tuned for use in the power utility application. A dynamic selection of which UPF and/or MEC node is to be used for a certain application or communication (or a more static selection of where the UPF and/or MEC node is to be deployed) may be performed based on network slicing principles described in more detail below. For instance, different devices on the network may be associated with different slices of the cellular network and one UPF node may be configured to handle routing (and/or other such user plane functions) for all the devices on a particular network slice while another UPF node may be configured to handle routing (and/or other such user plane functions) for devices on another network slice. Network slicing may also allow for the implementation of broadcast/multicast capabilities to allow devices to share notification messages among those devices using the same network slice, which may be a requirement of the messaging protocol being used (e.g., DTT). Network slicing provides the flexibility to configure this multicasting in multiple configurations among the same set of devices.

As has been described and as will be made apparent in the following description, various benefits and advantages may arise from using optimized cellular networks described herein for data communication in accordance with a set of parameters. In the power utility application example, for instance, all the requirements of the application (e.g., ultra-low latency, high reliability, etc.) may be satisfied just as they would be with a wired connection, but the burden of having to run and maintain the fibers or other lines providing the physical connections is alleviated by the migration to this wireless technology. Moreover, the ability of one device to multicast to devices by reference to different network slices and/or by way of different network components (e.g., different strategically selected UPF nodes, MEC nodes, etc.) may add an additional layer of flexibility that increases the efficiency and effectiveness of the network by optimizing traffic and ensuring that network components are utilized to their fullest extent (e.g., edge components being prioritized for data transfer that requires low latency, centralized components providing economical communication of messages that do not require such low latency, etc.).

Various specific implementations will now be described in detail with reference to the figures. It will be understood that the specific implementations described below are provided as non-limiting examples and may be applied in various situations. Additionally, it will be understood that other examples not explicitly described herein may also fall within the scope of the claims set forth below. Methods and systems described herein for cellular networks optimized for data communication in accordance with sets of parameters may provide any or all of the benefits mentioned above, as well as various additional and/or alternative benefits that will be described and/or made apparent below.

FIG. 1 shows a block diagram for an illustrative system 100 that includes a cellular network 102 that may be optimized for data communication in accordance with a set of parameters based on principles described herein. As shown, cellular network 102 may include a network core 104 that may be located at one or more centralized sites of cellular network 102, a cellular base station 106 that may be located at an edge site of cellular network 102, and a set of user plane function (UPF) nodes 108 that may be deployed to cellular network 102 at a plurality of sites including the edge site and the one or more centralized sites. In operation, cellular base station 106 of cellular network 102 may be configured to receive a data communication 110 that is to be delivered, in accordance with a set of parameters 112, from a first communication device 114-1 (e.g., a transmitter device for this particular communication) to a second communication device 114-2 (e.g., a receiver device for this particular communication). Moreover, the set of UPF nodes 108 may include a particular UPF node 108 that is configured to process data communication 110 in accordance with the set of parameters 112. With components thus configured, cellular network 102 may be capable, based on the processing by the particular UPF node 108, of delivering data communication 110 from communication device 114-1 to communication device 114-2 in accordance with set of parameters 112.

Each of the components of system 100, as well as other elements illustrated in FIG. 1, will now be described in more detail. In this description, the components and elements of FIG. 1 will largely be framed in general terms that would apply to a variety of different situations, applications, and/or use cases. However, for clarity of explanation, reference to the power utility application mentioned above will also be made to illustrate how a concrete implementation of system 100 may be embodied in one particular use case. As will be described, for example, the power utility implementation of system 100 may implement: 1) cellular network 102 as a 5G network; 2) network core 104 as a 5G standalone (5G SA) network core located at a central site of the 5G network; 3) cellular base station 106 as an gNodeB located at an edge site of the 5G network (wherein the gNodeB is configured to receive the data communication 110 that is to be delivered, in accordance with the set of parameters 112, from communication device 114-1 to communication device 114-2); and 4) the set of UPF nodes 108 as a set of UPFs deployed to the 5G network at a plurality of sites including the edge site and the central site (wherein the set of UPFs includes a particular UPF configured to process data communication 110 in accordance with set of parameters 112). As with the generalized example, this power utility implementation of system 100 may be implemented such that the 5G network is configured to deliver, based on processing by the particular UPF, the data communication from the first communication device to the second communication device in accordance with the set of parameters.

Cellular network 102 (e.g., the 5G network in the power utility implementation) may be implemented as any type of wireless network as may be configured to provide the flexibility and/or the optimizations described herein with respect to the set of parameters 112. One type of wireless network that may be well-positioned to implement cellular network 102 is a cellular network employing technologies that allow for user plane functions (e.g., data routing and forwarding, etc.) to be performed at different parts of the network (e.g., at a base station disposed at a desirable edge site, at the network core disposed at the central site, etc.). For example, cellular network 102 may be implemented as a 5G cellular network that is designed to provide higher data rates, lower latency, better reliability, and/or other benefits, features, and/or capabilities that may not be provided by other types or generations of cellular networks. A few such benefits of 5G networks may include, for instance, improved network capacity (e.g., an ability to support more devices and traffic than previous generation systems), reduced latency (e.g., an ability to transport data communications with reduced amounts of delay between transmission and receipt), enhanced security, and so forth.

In some examples, all or portions of cellular network 102 may be implemented as a "private" network that is independent from a "public" cellular network associated with a cellular service provider (e.g., the public 5G network of the cellular service provider). For instance, in the power utility example, it may be advantageous for the power utility company (or another such entity) to own and/or control (e.g., with support of the cellular provider) some or all of the equipment implementing cellular network 102, in order to optimize equipment siting, ensure guaranteed transmission capacity, and so forth. In this way, cellular network 102 and its various components may be tuned or optimized to serve the particular application of interest. For example, base stations such as cellular base station 106 may be placed strategically with respect to the locations of communication devices such as communication devices 114 (e.g., DTT controller devices at fixed locations in power substations and feeder sites, etc.) and UPF nodes 108 may be deployed or made available not only at centralized locations (e.g., a central location of network core 104) but also at edge locations such as locations of base stations associated with the communication devices 114. Software deployed to cellular network 102 may also be specifically configured with respect to the desired application (e.g., to incorporate predetermined sets of parameters associated with different types of data communications, etc.) and deployed and maintained within the private network in ways that may require more overhead and oversight if the cellular network were a public network accessed by millions of consumers.

In other examples, cellular network 102 may be implemented as or incorporated within a public cellular network or other public network (e.g., the internet). For instance, in the event that an entity setting up and using cellular network 102 (e.g., the power utility company in the power utility example) is unable to procure sufficient spectrum rights for cellular network 102 (or when other such challenges arise), a portion of a public network (for which spectrum rights are already procured and so forth) may be adapted to perform the functions of cellular network 102 described herein. In this scenario, use of cellular network 102 may be provided to the entity (e.g., by the cellular provider who manages the public cellular network) using an "as-a-service" model or the like. One advantage of this type of scenario may be that portions of network components may be utilized on an as-needed basis (e.g., a portion of the overall bandwidth that a UPF or MEC node may have) while other portions of the network components (e.g., whatever other bandwidth the UPF or MEC node may have available) can be employed for other uses (e.g., serving public customers, etc.).

Network core 104 (e.g., the 5G SA core in the power utility implementation) may serve as the control and interconnection facilities for cellular network 102 and, as such, may be disposed in one or more centralized locations (e.g., not necessarily proximate to communication devices 114 at the edge of the network). Network core 104 may be configured to provide functions such as, for example, authentication and authorization of users, session management for data traffic, policy management for network resources, network slicing to create dedicated virtual networks (network slices) for different applications, security for data traffic, quality of service (QOS) management for different types of communications, and so forth. In some examples, network core 104 may implement a cloud-native architecture where individual network functions are deployed as instances of software elements (e.g., virtual machines, containers, microservices, and the like) executing on hardware and dynamically scalable according to need and demand. This architecture allows for scalable and flexible deployments to support various services (e.g., private services for which cellular network 102 may be specifically configured, public services in examples where cellular network 102 is a public cellular network, etc.). As will be described in more detail below, it may be advantageous in some cases for UPF resources to be deployed to network core 104. In other cases, these resources may be deployed to edge sites so that low-latency data communication may be accomplished without the centralized network core 104 needing to be involved.

Cellular base station 106 (e.g., the gNodeB of the 5G network in the power utility implementation) may represent one of a plurality of base stations geographically distributed throughout the footprint of cellular network 102. Cellular base station 106 may serve or facilitate functions such as radio access (e.g., facilitating wireless radio communication between communication devices by encoding and decoding data, managing radio resources, etc.), mobility (e.g., managing handoff as devices move between cells, etc.), security (e.g., managing various aspects of encryption, authentication, authorization, etc.), QoS enforcement (e.g., ensuring that different applications and communications are properly prioritized so that different sets of parameters may all be satisfied, etc.), network slicing support, signaling, network and device monitoring, software and firmware maintenance, and so forth. As mentioned above (and as will be described and illustrated in more detail below), cellular base station 106 may, in certain examples and/or under certain circumstances, include or be configured to implement UPF and/or MEC functionality. In some examples, this may allow for data to be exchanged between communication devices locally without traveling to network core 104. In this way, very low latency communication may be accomplished for applications where parameters may call for it (e.g., for DTT controller devices configured to trip circuit breakers within milliseconds after a fault is detected in the power utility example).

The set of UPF nodes of cellular network 102 (referred to individually as UPF nodes 108 or collectively as the set of UPF nodes 108) are shown in FIG. 1 to be associated with both network core 104 and with cellular base station 106. As such, it will be understood that UPF nodes 108 may be implemented and/or deployed to either or both of the central locations of network core 104 and the edge locations of cellular base station 106 (as well as other edge locations of other base stations included in the cellular network and not explicitly represented in FIG. 1). Accordingly, as will be described and illustrated in more detail below, one data communication may be handled by one UPF node 108 of the set of UPF nodes in order to ensure that the data communication comports with applicable parameters pertaining to that communication, while a second data communication may be handled by a different UPF node 108 of the set of UPF nodes (e.g., a node implemented or deployed to a different site) in order to similarly ensure that the second data communication comports with the parameters that pertain to it.

Wherever each UPF node 108 in the set is deployed or implemented (e.g., at an edge site associated with a cellular base station, at a central site associated with the network core, etc.), the UPF node 108 may be configured to process data communications 110 in accordance with set of parameters 112. As used herein, this "processing" of data communication by UPF node 108 may refer to how the communication is routed and forwarded through the cellular network (e.g., analogous to the routing and forwarding performed by the serving gateway (SGW) of a 4G cellular network), how the communication is routed and forwarded to external networks (e.g., analogous to the routing and forwarding performed by the packet data network gateway (PGW) of a 4G cellular network), and/or how the data embedded in the communication is otherwise used and manipulated by the network. Accordingly, each UPF node 108 in the set of UPF nodes may be configured to perform user plane functions such as routing (e.g., determining the efficient and reliable data paths for traffic to travel through the network), forwarding (e.g., sending data traffic to the correct destination as called for by the transport protocol, etc.), security, QoS, and other types of processing of data traffic within cellular network 102. UPF nodes 108 may be implemented as dedicated hardware devices, as virtualized network functions that run on computing systems that are also implementing other virtualized network functions or performing other tasks, or in any other suitable way. In some examples, a UPF node 108 may be implemented as an application on a MEC device.

In some examples, a UPF node 108 may be associated with (e.g., deployed alongside or operating in connection with) a MEC node that performs certain data processing functions with respect to the data communication (e.g., processing functions that may also be directed by the UPF node 108). When implemented on the edge of the network, UPF nodes and MEC nodes may improve network latency and reduce the load on network core 104, thereby making cellular network 102 more flexible, responsive, and scalable for use with various innovative applications (e.g., including the power utility application).

Data communication 110 may represent any particular communication between network endpoints such as communication device 114-1 (e.g., the transmitting device in this particular example) and communication device 114-2 (e.g., the receiving device in this particular example). For instance, if the communication devices 114 are DTT controller devices in a power utility application, data communication 110 may include a message indicating that an electrical fault has been detected and appropriate measures are to be immediately taken (e.g., tripping a breaker, deenergizing a circuit, etc.). Depending on the nature of data communication 110, the set of parameters 112 may indicate certain limitations, requirements, tolerances, targets, characteristics, and so forth that are relevant to the transport of data communication 110. The set of parameters may include any number of such parameters from zero parameters (for communications that may be transmitted without any specified limitations) to a large number of parameters (for communications that are limited with very specific requirements for how they are to be transmitted).

FIG. 1 shows a few examples of parameters that may be defined in the set of parameters 112. Specifically, as shown, a latency parameter (also referred to as a latency tolerance parameter) may specify the maximum latency that data communication 110 may be able to tolerate (e.g., 1 ms or the like in the example of a DTT trip instruction, 1 second or the like in the example of a DTT notification, etc.). A reliability parameter may specify one or more QoS or other transfer requirements (other than latency) with which data communication 110 must be transmitted. One or more device characteristics parameters may specify attributes of communication devices 114 such as where each device is located, which cellular base station it is connected to, what networking capabilities it has, its addressing information, or the like. Other suitable parameters mentioned herein or as may serve a particular implementation are represented by an ellipsis ( . . . ) in FIG. 1 and will be understood to also be included in certain sets of parameters 112.

As will be described in more detail below, data communication 110 may be transmitted from communication device 114-1 to communication device 114-2 in accordance with the set of parameters 112 based on how cellular network 102 is set up or configured. For example, a particular UPF node 108 from the set of UPF nodes 108 may be preselected or dynamically selected (e.g., in real time or near real time) to optimize cellular network 102 for delivering data communication 110 in accordance with the set of parameters 112.

FIG. 2 shows an illustrative method 200 performed by a cellular network optimized for data communication in accordance with a set of parameters based on principles described herein. For example, method 200 may be performed by cellular network 102 and/or components thereof (e.g., network core 104, cellular base station 106, a particular UPF node 108 of the set of UPF nodes, etc.) in furtherance of delivering data communication 110 from communication device 114-1 to communication device 114-2 in accordance with the set of parameters 112. While FIG. 2 shows illustrative operations 202-206 according to one implementation, other implementations may omit, add to, reorder, and/or modify any of the operations 202-206 shown in FIG. 2. In some examples, multiple operations shown and/or described in relation to FIG. 2 may be performed concurrently (e.g., in parallel) with one another, rather than being performed sequentially as illustrated and/or described. One or more of the operations shown in FIG. 2 may be performed by an implementation of cellular network 102 and/or any component or element thereof.

Part or all of method 200 may, at least in certain circumstances, be performed in real time so as to provide, receive, process, and/or use data described herein immediately as the data is generated, updated, changed, exchanged, or otherwise becomes available. In such examples, operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-206 of method 200 will now be described in more detail as the operations may be performed by an implementation of cellular network 102.

At operation 202, cellular network 102 may receive (e.g., at cellular base station 106) a data communication (e.g., data communication 110) that is to be delivered from a first communication device to a second communication device (e.g., from communication device 114-1 to communication device 114-2). The data communication may be associated with a set of parameters (e.g., set of parameters 112) in accordance with which the data communication is to be delivered. For example, as has been described, the set of parameters may specify a latency tolerance or other such requirements or targets that are to be accounted for by the cellular network when carrying and delivering the data communication. The association with the set of parameters may be through the use of a network slice that has been configured to implement a network path that is consistent with the parameters. For example, a network slice may be configured such that the network elements in the communications path between communication devices 114-1 and 114-2 are minimized to ensure latency below the target latency, may be configured to cap the number of devices 114 that can use the network slice to ensure sufficient bandwidth, may associate communications using the network slice with a quality of service that ensures reliable delivery, and so forth. Data communication 110 may be transmitted using a network slice identifier (e.g., Network Slice Selection Assistance Information (NSSAI)) that indicates to network elements (such as the cellular base station 106 and UPF nodes 108) how to process the communication. For example, communication devices 114 may receive UE Route Selection Policy (URSP) information from cellular network 102 that indicates which network slices are available for their use, and may select the identifiers for the network slice that is appropriate for the data communication 100.

At operation 204, a particular UPF node (e.g., one of UPF nodes 108) may process (e.g., route, manipulate, use, etc.) the data communication 110 in accordance with the set of parameters 112. The particular UPF node may be included among a set of UPF nodes (e.g., the set of UPF nodes 108) deployed to the cellular network at a plurality of sites including, for example, an edge site associated with a cellular base station of the cellular network (e.g., cellular base station 106), a central site associated with a network core of the cellular network (e.g., network core 104), and/or other suitable sites within the network. As such, different UPF nodes selected for use from this set may result in different outcomes for how the data communication moves through the network to be delivered from the first device to the second device. For instance, as has been mentioned, if the particular UPF node 108 performing operation 204 is implemented at an edge site (e.g., in a cellular base station such as cellular base station 106), this UPF node 108 may be configured to route and otherwise process the data communication 110 in a manner that provides a very low latency (if that is what the set of parameters calls for). As another example, if the particular UPF node 108 performing operation 204 is implemented at a central site (e.g., in a network core such as network core 104), this UPF node 108 may be configured to route and otherwise process the data communication 110 in a manner that efficiently takes advantage of a looser latency tolerance (in the event that that is what the set of parameters calls for). In some implementations, the use of UPF nodes may be specified by the network slice definition. For example, a network slice may specify the UPF nodes to use for traffic using a specific slice, which may ensure that only edge-located UPF nodes are included in a transmission path to reduce latency.

At operation 206, the cellular network may deliver the data communication from the first communication device to the second communication device in accordance with the set of parameters. For example, this delivering may be performed based on the processing, at operation 204 by the particular UPF node, of the data communication in accordance with the set of parameters. For instance, if the particular UPF node is deployed to the edge of the network, the processing may involve routing the data communication to use the same cellular base station at which it is received to send the communication to the receiver communication device (which, in this example, may also be in direct communication with the cellular base station) without being routed through other parts of the network such as the centralized network core. Based on this direction, the network may be able to deliver the data communication in accordance with even a very tight latency requirement (e.g., on par with the latency of a direct wired connection) if that is what the set of parameters calls for.

Figure 3:
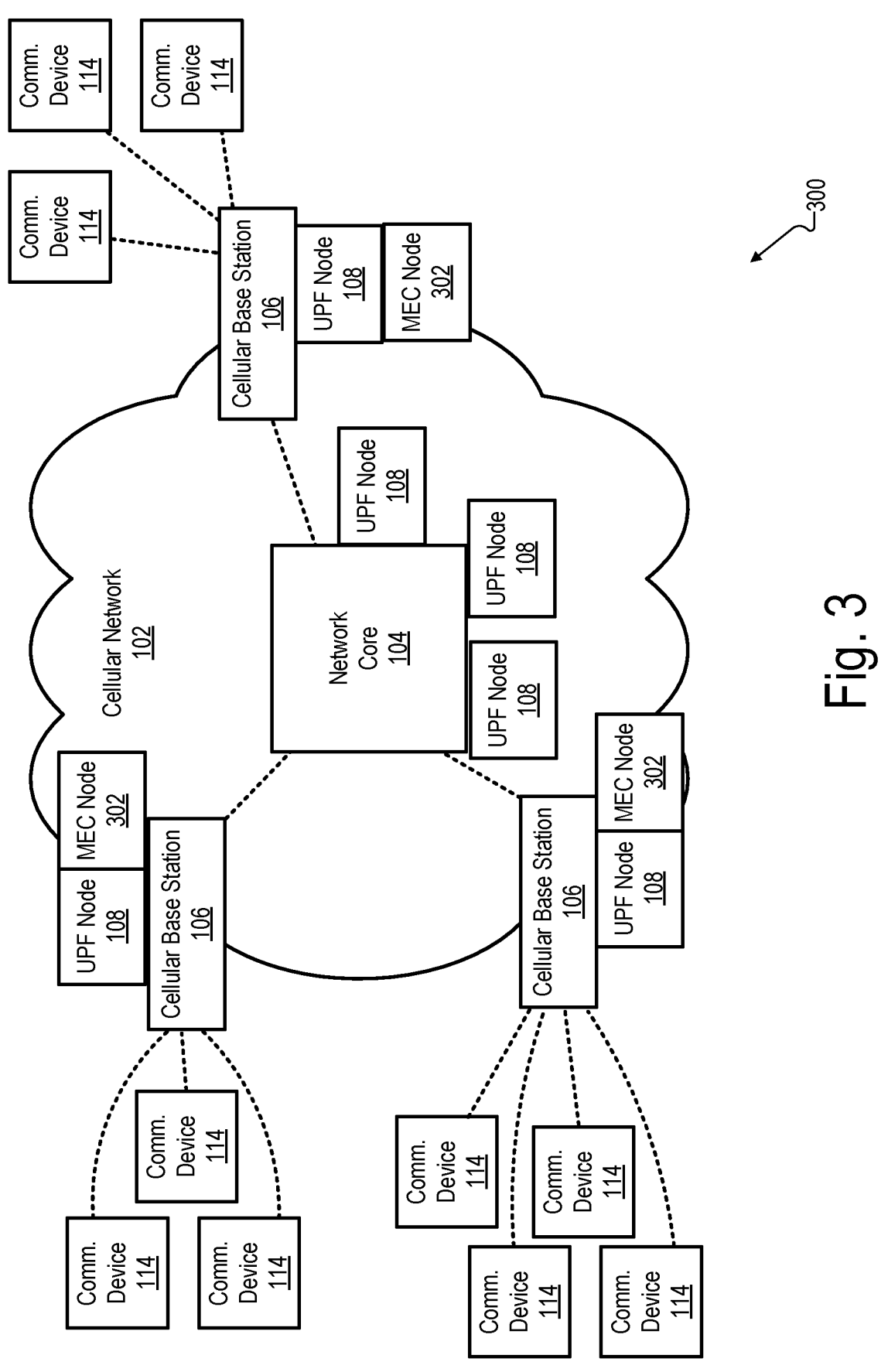
FIG. 3 shows an illustrative configuration in which a cellular network optimized for data communication in accordance with a set of parameters may operate using principles described herein.

FIG. 3 shows an illustrative configuration 300 in which a cellular network 102 optimized for data communication in accordance with a set of parameters may operate using principles described herein. More particularly, while FIG. 1 illustrated a block diagram of system 100 that included one implementation of cellular network 102 with a relatively minimal number of components that were each introduced and described, configuration 300 shows a more expanded implementation of cellular network 102 in which a variety of the elements described in relation to system 100 (e.g., several cellular base stations 106, several UPF nodes 108 with corresponding MEC nodes 302, a larger number of communication devices connected to the cellular network, etc.) are represented. It will be understood that even this expanded implementation of the cellular network may represent a simplified implementation of cellular network 102. Other implementations of cellular network 102, for instance, may include multiple centralized core components, a much larger number of cellular base stations and/or UPF/MEC nodes (e.g., dozens, hundreds, thousands, etc.) so as to cover a relatively large geographical footprint and to provide a communicative fabric for a potentially large number (e.g., hundreds, thousands, millions, etc.) of communication devices.

As shown in configuration 300, cellular network 102 includes a centralized network core 104 that may be implemented in multiple locations and provides management and transport between edge locations. In FIG. 3, network core 104 is drawn in a centralized location (e.g., in the middle of the cloud representing cellular network 102). Network core 104 is communicatively coupled (e.g., as illustrated by dotted lines) to a plurality of cellular base stations 106 that are drawn at various edge locations of the network (e.g., at different points along an edge of the cloud representing cellular network 102). A set of UPF nodes 108 are shown to be deployed to cellular network 102 at a variety of sites including at various edge sites associated with cellular base stations 106 and at the central sites associated with network core 104. Configuration 300 shows that a different respective UPF node 108 is deployed to each cellular base station 106 while several UPF nodes 108 are deployed to network core 104. Certain UPF nodes 108 shown in FIG. 3 are also shown to be communicatively coupled with a respective MEC node 302. In some examples, a MEC node 302 may be shared by multiple UPF nodes 108. In other examples, a UPF node may be deployed without a corresponding MEC node 302.

Various communication devices 114 ("Comm. Device" 114) are illustrated in configuration 300 to be communicatively coupled to cellular network 102 by way of connections to cellular base stations 106. For example, these communication devices 114 may be geographically distributed to various locations and may connect to whichever cellular base station 106 is in range or provides the strongest signal. In some transactions, a given communication device 114 may serve as a transmitting device that provides data communications to be received by one or more other receiving devices. In other transactions, that communication device 114 may take the role of the receiving device that is receiving data communications transmitted by another device. In examples where communication devices 114 implement a multicast protocol (e.g., when the communication devices 114 have data that is to be communicated to multiple devices), a UPF node 108 selected to provide the routing and/or direct other such user plane processing may be configured to handle multicast protocols. For example, a network slice, a multicast group, or another broadcast domain may be designated by the transmitting device to indicate the group of receiving devices that are to receive the data communication. The UPF node 108 that directs the processing of the data communication may then perform routing to ensure that each of those receiving devices receives the multicast communication. As will be described in more detail below, network slicing may be used in certain implementations to help identify which communication devices 114 are to receive a given multicast communication, as well as to help determine which UPF node or UPF nodes 108 are to be utilized.

Figure 4:
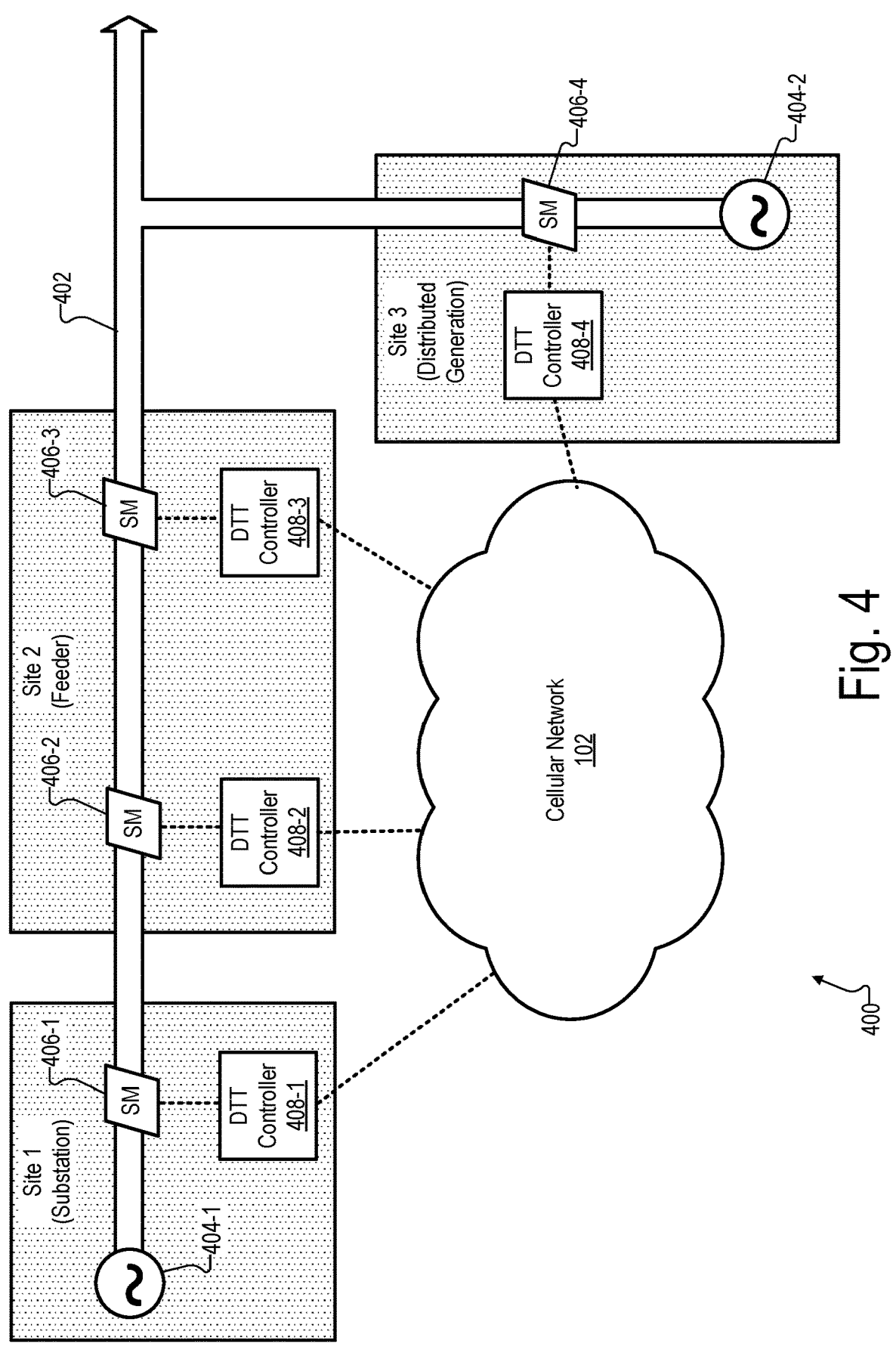
FIG. 4 shows an example power utility application in which a cellular network such as described herein may be optimized to provide data communication in accordance with a set of parameters to satisfy various objectives of the power utility application.

In various examples already mentioned, reference has been made to a power utility implementation of cellular network 102. To further illustrate this concrete (albeit non-limiting) example of how cellular network 102 may be used to provide value when applied to a particular use case, FIG. 4 shows an example power utility application 400. In power utility application 400, an implementation of cellular network 102 is shown to provide data communication in accordance with parameters configured to satisfy certain objectives of the power utility application.

Power utility application 400 is shown to include an electric circuit 402 that serves as a transmission line for power generated at one or more power sources 404. For example, a first power source 404-1 is shown to be present at a substation located in one site ("Site 1 (Substation)"), while another power source 404-2 is shown to be present at a distributed generation (DG) site ("Site 3 (Distributed Generation)") that may be configured to help distribute power to customer premises and other parts of the grid. Power source 404-1 may represent power supplied by a power utility company (e.g., derived from hydroelectric, wind, nuclear, coal, or another suitable source), while power source 404-2 may represent a smaller source of power supplied directly by solar panels or another such source at the DG site (Site 3). To safely administer and control the power on electric circuit 402, a variety of safety mechanisms (SM) 406 (e.g., circuit breakers, switches, transformers, etc.) may be deployed to electric circuit 402. For instance, as shown in the example of power utility application 400, a first safety mechanism 406-1 is shown to be present at Site 1 (the substation in this example), a second safety mechanism 406-2 and a third safety mechanism 406-3 are shown to be present at Site 2 (a feeder station in this example), and a fourth safety mechanism 406-4 is shown to be present at Site 3 (a DG site in this example). Each of these safety mechanisms 406 is shown to be communicatively coupled to and controlled by a respective direct transfer trip (DTT) controller device 408 (e.g., DTT controller device 408-1 controlling safety mechanism 406-1, DTT controller device 408-2 controlling safety mechanism 406-2, and so forth). As further shown, these respective DTT controller devices 408 are all connected to an implementation of cellular network 102, which, as has been described, may be implemented as a 5G cellular network or as any other suitable communication network as may serve a particular implementation.

DTT controller devices 408 may be configured to serve various objectives. For example, DTT systems may be designed to increase availability of distribute generation by preventing the indiscriminate disconnection of the sites. Since DTT signals have traditionally been sent between substations and remote DG sites using leased telephone lines, DTT systems will disconnect the DG site if DTT communication is interrupted. However, since leased copper lines may be relatively less reliable (leading to unwanted disconnection of DG sites) and since the cost of fiber may make it infeasible or undesirable, DTT controller devices 408 may provide DTT signals using innovative 5G SA URLLC/network slicing, where, as described herein, UPF and MEC nodes may be localized, wireless communications may meet latency requirements, peer-to-peer multicast communications may be performed, and so forth. When a line fault occurs, the protection scheme implemented by DTT controller devices 408 may interrupt the fault current and quickly disconnect DG power sources to thereby protect sites from any damages and to limit voltages/currents from feeding into a faulted circuit. To this end, DTT controller devices 408 may provide true redundant communication capability, may be aware of all feeder circuit primary switch statuses, and may be system interoperable and relatively future proof (e.g., using IEC61850 (GOOSE protocol) or other such standards). When operating properly in accordance with principles described herein, DTT controller devices 408 will ensure that, when a fault is detected, distributed generation will not continue to energize an island (e.g., ceasing energization of the island in less than 2 second according to the IEEE 1547 standard). In this way, the DTT scheme described herein may promote safety and utility control, guard against overvoltages, and so forth.

As mentioned above, power utility application 400 may serve as a concrete example of how system 100 may be implemented and used in operation (e.g., to perform method 200 and/or other functions described herein). For example, the first and second communication devices 114-1 and 114-2 described in connection with FIG. 1 may be implemented here as DTT controller devices 408 deployed to a power grid (e.g., to electric circuit 402). The set of parameters 112 described in connection with FIG. 1 may indicate (possibly among other things) at least a latency tolerance parameter for a data communication 110 that one of the DTT controller devices 408 may transmit (e.g., as a multicast or unicast communication). As such, the delivering of the data communication 110 in accordance with the set of parameters 112 may include delivering the data communication 110 in accordance with the latency tolerance parameter. For instance, if each DTT controller device 408 is configured to direct electric circuit 402 to be deenergized in response to detection of an electrical fault on electric circuit 402, a data communication 110 delivered from a first DTT controller device 408 (e.g., DTT controller device 408-2) may include: 1) an indication that an electrical fault is detected on electric circuit 402, and 2) an instruction to another DTT controller device 408 (e.g., DTT controller device 408-3) to immediately direct electric circuit 402 to be deenergized. In response to receiving this communication, the second DTT controller device 408 may act immediately to deenergize the electric circuit and thereby ensure that no harm will come to personnel or equipment associated with electric circuit 402. For example, the latency parameter may require that the DTT communication be delivered and the circuit be tripped within approximately 1-2 milliseconds. While this has conventionally required that DTT controller devices be physically connected (e.g., by fiber, etc.), cellular network 102 may be configured to deliver the DTT communication with suitable latency by using the principles described herein.

In some examples, this communication may be a multicast communication configured to indicate the electrical fault and provide the deenergize instruction to all the DTT controller devices 408 associated with electric circuit 402. For example, along with DTT controller device 408-3 receiving the communication, DTT controller devices 408-1 and 408-4 may, in certain examples, also receive the communication transmitted by DTT controller device 408-2, such that they likewise may disconnect from the circuit (e.g., tripping the breaker or otherwise directing the respective safety mechanism 406 to deenergize the electric circuit 402).

DTT communications sent by communication devices in power utility application 400 may use any suitable protocol as may serve a particular implementation. For instance, in some examples, a point-to-point layer 2 Generic Object Oriented Sub-system Environment (GOOSE) protocol may be used. In the same or other examples, multicast messages may be communicated via a point-to-multipoint layer 2 GOOSE protocol or another suitable layer 2 protocol. The GOOSE protocol is configured to exchange control plane information between different network elements in 5G networks and, as such, may be well adapted to transmit a variety of control plane information (e.g., routing information, QoS information, security information, etc.). GOOSE messages may be transmitted using any suitable transport protocol (e.g., SCTP) to ensure that the messages are delivered reliably and in the correct order.

Figure 5:
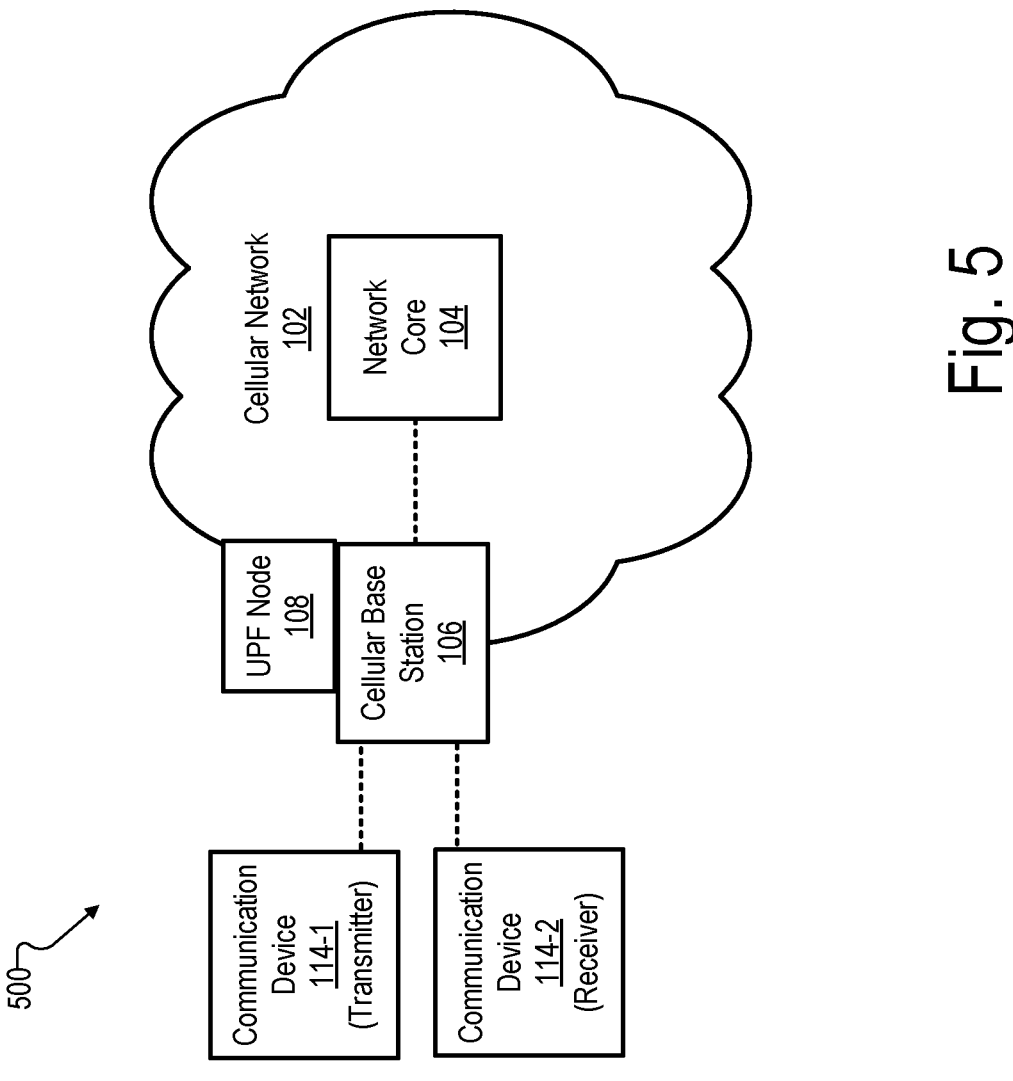
FIGS. 5-7 illustrate different example scenarios in which cellular networks may be optimized for data communication in accordance with different example sets of parameters based on principles described herein.
Figure 6:
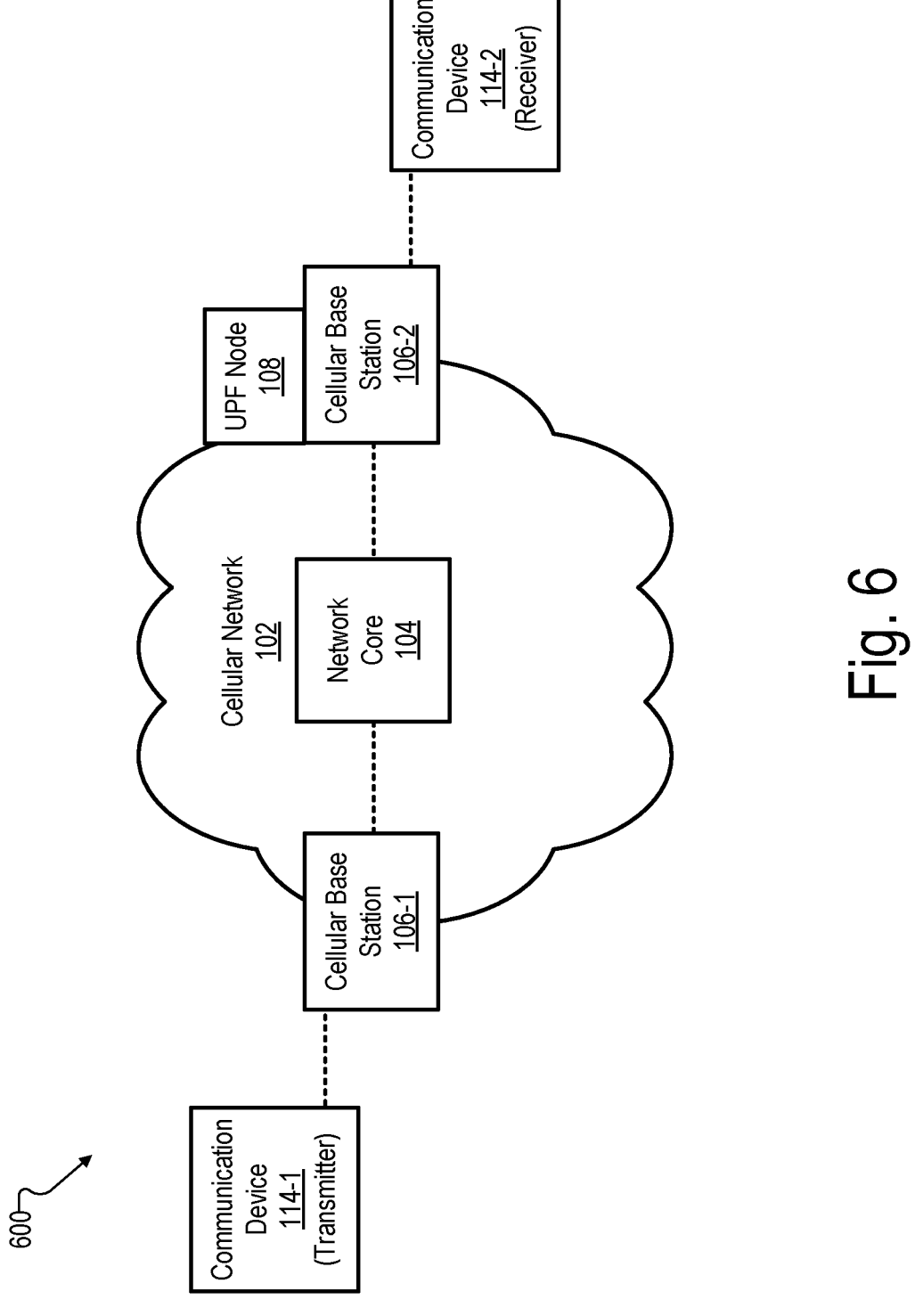
Figure 7:
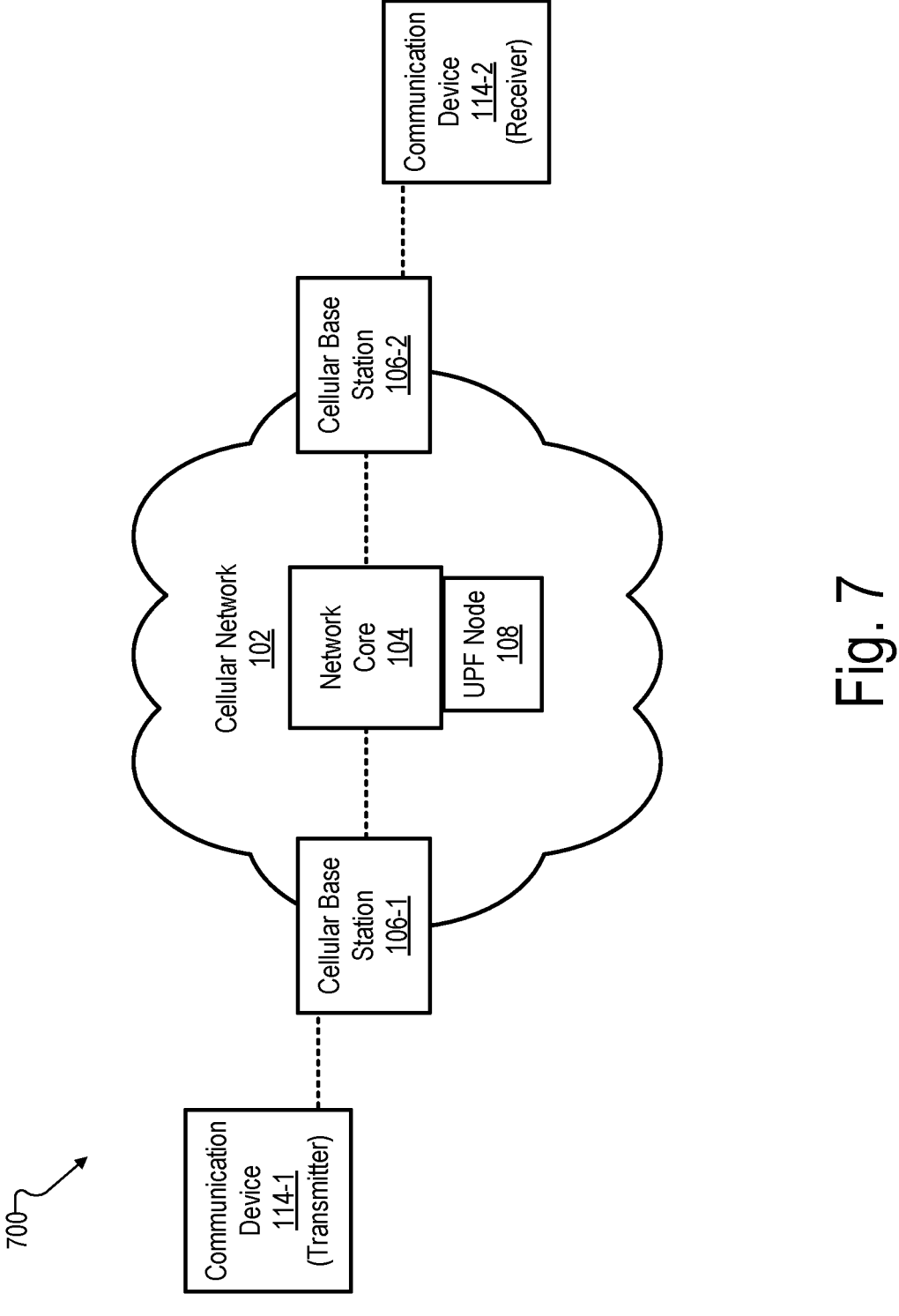

FIGS. 5-7 illustrate different example scenarios in which an implementation of cellular network 102 may be optimized for data communication in accordance with different example sets of parameters based on principles described herein. For example, referring to the power utility application example described above (e.g., power utility application 400) FIG. 5 may represent an example scenario 500 that requires an extremely low latency (e.g., to trip the circuit when a fault is discovered, etc.), while FIGS. 6 and 7 may represent example scenarios 600 and 700, respectively, where there may be more latency tolerance (e.g., for sending information about the fault that is to be used for a notification or log, rather than to immediately deenergize the circuit).

Referring to FIG. 5, cellular network 102 is shown to include network core 104 and at least one cellular base station 106 to which a UPF node 108 is deployed. In this example, both communication device 114-1 (the "Transmitter" device in this example) and communication device 114-2 (the "Receiver" device in this example) are communicatively coupled to the same cellular base station 106. This fact that both the first and second communication devices 114-1 and 114-2 are connected to cellular base station 106 may be indicated in the set of parameters along with a relatively restrictive latency tolerance parameter for a data communication to be transmitted by communication device 114-1 (e.g., a low latency requirement for a DTT communication to immediately deenergize an electric circuit or the like). Accordingly, the particular UPF node 108 shown in scenario 500 may be configured to process the data communication locally at this cellular base station 106 at the edge site of cellular network 102. By avoiding transport of the data communication to a central core network UPF node, the travel time for communication transmitted between communication devices 114 can be reduced to satisfy the low latency parameter. The UPF node 108 may be implemented as part of a network slice that routes data communications between devices connected to cellular base station 106.

Referring to FIG. 6, cellular network 102 is shown to include network core 104 along with at least a first cellular base station 106-1 and a second cellular base station 106-2. In this example, communication device 114-1 (the "Transmitter" device in this example) is communicatively coupled to cellular base station 106-1, while communication device 114-2 (the "Receiver" device in this example) is communicatively coupled to cellular base station 106-2. For instance, in this scenario, communication device 114-1 may represent a DTT controller device that transmits a data communication about a detected electrical fault, while communication device 114-2 may represent another type of system that collects and logs this type of data at a different location (e.g., potentially remote from communication device 114-1, such that they no longer share access to the same cellular base station 106).

This fact that the first communication device 114-1 is connected to cellular base station 106-1 and that communication device 114-2 is connected to an additional cellular base station that is communicatively coupled to cellular base station 106-1 by way of network core 104 (i.e., cellular base station 106-2) may be indicated in the set of parameters along with a relatively loose latency tolerance parameter for a data communication to be transmitted by communication device 114-1. For example, as mentioned, this latency parameter may be less restrictive than the latency parameter described in relation to scenario 500 since the communication in scenario 600 may not require such immediate action. For instance, rather than deenergizing an electrical circuit for safety reasons, the communication of scenario 600 may be used to send a lower-priority notification, to update a data log, or the like.

Here again, the particular UPF node 108 shown in scenario 600 may process the data communication in accordance with the latency tolerance parameter by being deployed to the additional cellular base station 106-2. Though the edge site of second cellular base station 106-2 may not be particularly localized to where the data communication is transmitted (e.g., local to communication device 114-1), the UPF node 108 (as well as, potentially, a MEC node not explicitly shown) may be deployed to the edge site local to communication device 114-2 to satisfy the less restrictive latency tolerance parameter.

The scenario 700 illustrated in FIG. 7 is similar to scenario 600 illustrated in FIG. 6. However, in this case, the particular UPF node 108 is shown to process the data communication in accordance with the latency tolerance parameter by being deployed to network core 104 (rather than to either edge site of either cellular base station 106-1 or 106-2). In this case again, the UPF node 108 (as well as, potentially, a MEC node not explicitly shown) may be capable of satisfying a relatively loose latency tolerance parameter if that is what the set of parameters for the communication allows. The use of these centralized resources may be highly efficient, economical, and otherwise advantageous given a scenario in which the low latency providable only by edge-deployed UPF/MEC nodes is not required by the set of parameters.

While the examples of scenarios 500-700 (in FIGS. 5-7) have shown unicast communications between a single transmitter (e.g., communication device 114-1) and a single receiver (e.g., communication device 114-2), it will be understood that in certain scenarios (e.g., including scenarios described above for power utility application 400) multicast communications from one transmitter to a plurality of different receivers may be desirable or necessary. In conventional networks, such multicasting may be accomplished by transmitting a multicast message to every device on a local area network (LAN) or the like. For instance, if DTT controller devices such as DTT controller devices 408 were communicatively interconnected by fiber optic lines, one device may transmit a DTT message over the various fibers to each of the other devices (or to a centralized hub that forwards the message to the other devices). To accomplish a similar objective using optimized cellular networks described herein (e.g., an implementation of cellular network 102), network slicing technologies described herein may be employed. For example, if a first communication device (e.g., communication device 114-1) is to multicast a data communication to a group of other communication devices that includes a second communication device (e.g., communication device 114-2), cellular network 102 may define a network slice to include the second communication device to which the data communication is to be delivered. Based on that network slice (that includes the second communication device), cellular network 102 may select a particular UPF node (e.g., from the set of UPF nodes 108) to perform the processing of the data communication. In some examples, the network slice may include multiple devices that are different distances from the transmitter (e.g., at least one local device connected to the same cellular base station 106 and at least one remote device connected to a remote cellular base station 106). In such examples, cellular network 102 may be configured to use both a local UPF node 108 and a remote UPF node 108 by using network slicing and sending multiple messages out. For example, two connections may be established (e.g., one using a local UPF node 108 and one using a remote UPF node 108) and the area where the multicast transmission can be sent may therefore be expanded.

Figure 8:
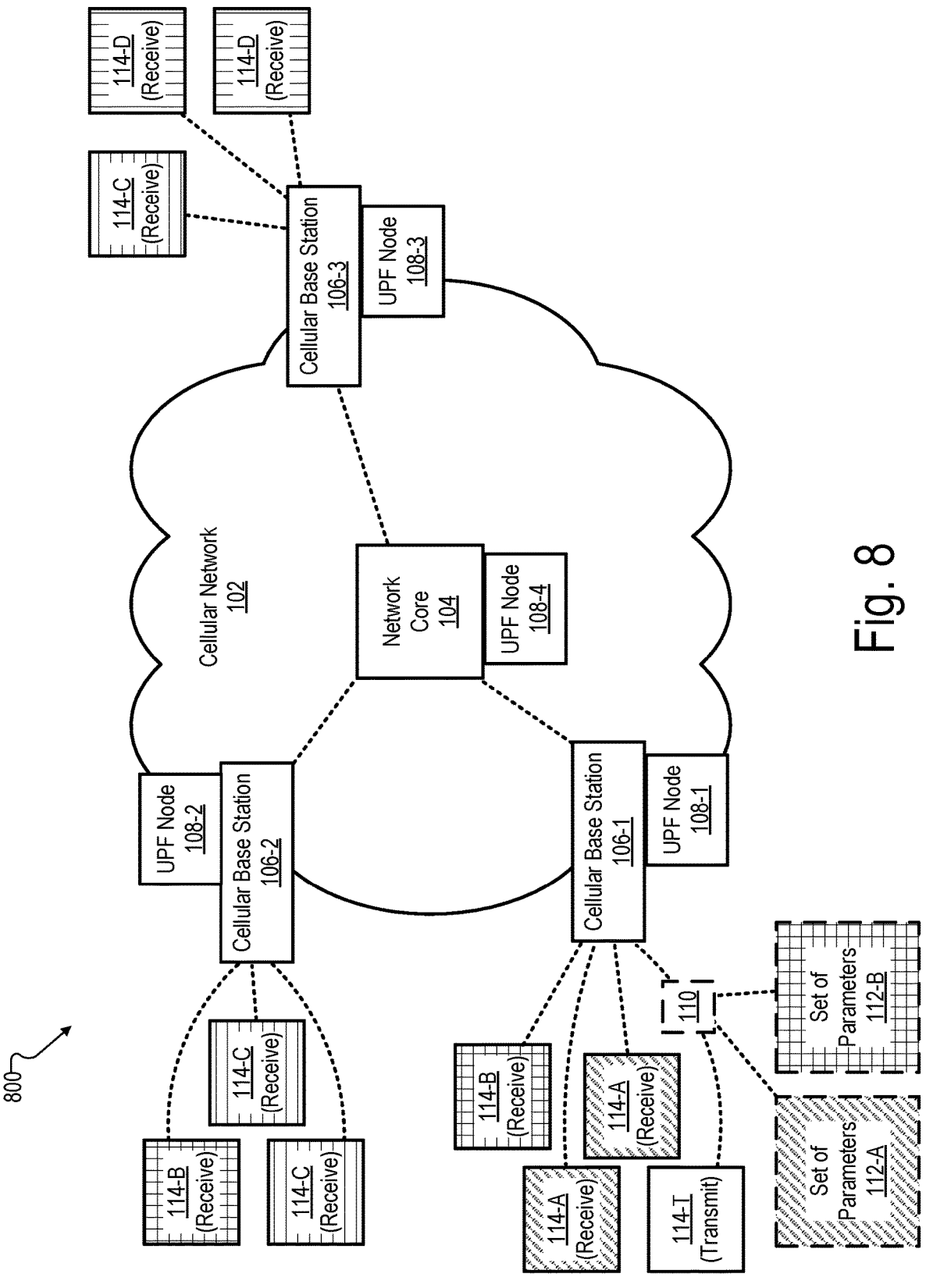
FIG. 8 shows an illustrative configuration in which a cellular network may employ network slicing to optimize data communication in accordance with different sets of parameters based on principles described herein.

To further illustrate these principles, FIG. 8 shows an illustrative configuration 800 in which cellular network 102 may employ network slicing to optimize data communication in accordance with different sets of parameters based on principles described herein. As shown, illustrative configuration 800 is similar to configuration 300 in terms of the cellular network 102, the network core 104, the cellular base stations 106, and some of the UPF nodes 108 that are depicted (it is noted that MEC nodes 302 are omitted from this configuration for illustrative clarity and that the various network elements are numbered with more specificity to allow for more precise referencing in the following description).

Several communication devices 114 are also shown to be connected to the various cellular base stations 106 in similar ways as illustrated and described above in relation to configuration 300. However, unlike configuration 300, configuration 800 depicts a particular data communication 110 that may be multicast from one of the communication devices 114 to certain other communication devices 114. Moreover, configuration 800 annotates each communication device 114 to indicate whether it is transmitting (communication device 114-T, which is indicated to "Transmit") or whether it is receiving (the other communication devices 114, which are indicated to "Receive"). Different letters and fill patterns are also used in configuration 800 to distinguish between different network slices that each receiving communication device 114 may be associated with. Specifically, as shown, a diagonal hash pattern is used as a fill pattern for certain communication devices 114-A, a grid hash pattern is used as a fill pattern for certain communication devices 114-B, a horizontal hash pattern is used as a fill pattern for certain communication devices 114-C, and a vertical hash pattern is used as a fill pattern for certain communication devices 114-D.

These different groups of receiving communication devices 114-A, 114-B, 114-C, 114-D will be understood to be associated with different network slices that have been defined for cellular network 102. For example, a network slice referred to as slice A will be understood to include communication devices 114-A (both of which are connected to cellular base station 106-1), a network slice referred to as slice B will be understood to include communication devices 114-B (one of which is connected to cellular base station 106-1 and the other of which is connected to cellular base station 106-2), a network slice referred to as slice C will be understood to include communication devices 114-C (two of which are connected to cellular base station 106-2 and one of which is connected to cellular base station 106-3), and a network slice referred to as slice D will be understood to include communication devices 114-D (both of which are connected to cellular base station 106-3).

When communication device 114-T sends data communication 110, configuration 800 shows that the communication may be associated with different sets of parameters 112. For example, in the event that data communication 110 is to be transmitted to communication devices 114-A on slice A, data communication 110 is shown to be associated with a first set of parameters 112-A (drawn with the same diagonal hash pattern indicative of slice A). In the event that data communication 110 is to be transmitted to communication devices 114-B on slice B, data communication 110 is shown to further be associated with a second set of parameters 112-B (drawn with the same grid hash pattern indicative of slice B). It will be understood that still other sets of parameters could define how the communication is to be carried out if it were to be multicast to slices C or D or other network slices of cellular network 102 (not explicitly shown).

Different UPF nodes may be selected based on the network slices that have been defined, as well as based on the parameters that are requested for the given data communication 110. In some examples, data communication 110 may be multicast only to a single network slice, whereas, in other examples, data communication 110 may be multicast to multiple network slices. In either case, one or more UPF nodes 108 may be selected to process data communication 110 in accordance with the relevant set of parameters.

As one particular example, for instance, data communication 110 may be multicast from communication device 114-T to communication devices on both slices A and B (e.g., communication devices 114-A and communication devices 114-B). In this case, UPF node 108-1 may process data communication 110 in accordance with set of parameters 112-A for delivery of data communication 110 to communication devices 114-A. For instance, the set of parameters 112-A may require relatively low latency that may be accomplished only by localizing the UPF node and keeping data communication 110 at the edge of cellular network 102 (rather than moving it through cellular network 102 to network core 104). At the same time, UPF node 108-2 or UPF node 108-4 may be used to process data communication 110 in accordance with the set of parameters 112-B for delivery of data communication 110 to communication devices 114-B. For instance, the set of parameters 112-B may allow relatively high latency that may afford time for data communication 110 to move through the network to network core 104 and to cellular base station 106-2 (where one of communication devices 114-B is connected).

As shown in this example, cellular network 102 may define a first network slice (slice A) to include the communication devices 114-A to which data communication 110 is to be delivered and a second network slice (slice B) to include the communication devices 114-B to which data communication is to further be delivered. Accordingly, the UPF node 108 used to perform the processing of data communication 110 for delivery to communication devices 114-A (e.g., UPF node 108-1) may be selected based on this first network slice (slice A), while the UPF node 108 used to perform the processing of data communication 110 for delivery to communication devices 114-B (e.g., UPF node 108-2 or UPF node 108-4) may be selected based on the second network slice (slice B). Other factors may also be accounted for in selecting UPF nodes to serve various network slices and/or to deliver various data communications. For example, cellular network 102 may ensure that a selected UPF node is able to provide a particular latency, a particular throughput, a particular level of security, a particular QoS, a particular cost-effectiveness, or the like, for the particular slice that the UPF node is selected to serve.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

FIG. 9 shows an illustrative computing system 900 that may implement any of the computing systems described herein, including those employed as part of cellular networks optimized for data communication in accordance with a set of parameters (e.g., implementations of cellular network 102 and components thereof). As shown in FIG. 9, computing system 900 may include a communication interface 902, a processor 904, a storage device 906, and an input/output (I/O) module 908 communicatively connected via a communication infrastructure 910. While an illustrative computing system 900 is shown in FIG. 9, the components illustrated in FIG. 9 are not intended to be limiting. Additional or alternative components may be used in other embodiments. Components of computing system 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation. In some examples, any of the facilities described herein may be implemented by or within one or more components of computing system 900.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

In the preceding description, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:

receiving, by a cellular network, a data communication that is to be multicast from a first communication device and delivered to a second communication device in accordance with a set of parameters and to a third communication device in accordance with an additional set of parameters;

processing, by a particular user plane function (UPF) node of a set of UPF nodes deployed to the cellular network at a plurality of sites including an edge site associated with a cellular base station and a central site associated with a network core, the data communication in accordance with the set of parameters for delivery of the data communication to the second communication device;

processing, by an additional UPF node of the set of UPF nodes, the data communication in accordance with the additional set of parameters for delivery of the data communication to the third communication device;

delivering, by the cellular network and based on the processing by the particular UPF node, the data communication from the first communication device to the second communication device in accordance with the set of parameters; and delivering, by the cellular network and based on the processing by the additional UPF node, the data communication from the first communication device to the third communication device in accordance with the additional set of parameters.

2. The method of claim 1, wherein:

the first and second communication devices are direct transfer trip (DTT) controller devices deployed to a power grid;

the set of parameters indicates a latency tolerance parameter for the data communication; and the delivering of the data communication in accordance with the set of parameters includes delivering the data communication in accordance with the latency tolerance parameter.

3. The method of claim 2, wherein:

the second communication device is configured to direct an electric circuit to be deenergized in response to detection of an electrical fault on the electric circuit; and the data communication from the first communication device includes an indication that the electrical fault is detected on the electric circuit and an instruction to the second communication device to immediately direct the electric circuit to be deenergized.

4. The method of claim 1, further comprising:

defining, within the cellular network, a network slice to include the second communication device to which the data communication is to be delivered; and selecting, based on the network slice that includes the second communication device, the particular UPF node from the set of UPF nodes to perform the processing of the data communication.

5. The method of claim 1, wherein:

the set of parameters indicates that both the first and second communication devices are connected to the cellular base station and further indicates a latency tolerance parameter for the data communication; and the particular UPF node processes the data communication in accordance with the latency tolerance parameter by being deployed to the cellular base station at the edge site.

6. The method of claim 1, wherein:

the set of parameters indicates:

the first communication device is connected to the cellular base station, the second communication device is connected to an additional cellular base station communicatively coupled to the cellular base station by way of the network core, and a latency tolerance parameter for the data communication; and the particular UPF node processes the data communication in accordance with the latency tolerance parameter by being deployed to the additional cellular base station.

7. The method of claim 1, wherein:

the set of parameters indicates:

the first communication device is connected to the cellular base station, the second communication device is connected to an additional cellular base station communicatively coupled to the cellular base station by way of the network core, and a latency tolerance parameter for the data communication; and the particular UPF node processes the data communication in accordance with the latency tolerance parameter by being deployed to the network core.

8. The method of claim 1, further comprising:

defining, within the cellular network, a first network slice to include the second communication device to which the data communication is to be delivered and a second network slice to include the third communication device to which the data communication is to be delivered;

selecting, based on the first network slice that includes the second communication device, the particular UPF node from the set of UPF nodes to perform the processing of the data communication for delivery of the data communication to the second communication device; and selecting, based on the second network slice that includes the third communication device, the additional UPF node from the set of UPF nodes to perform the processing of the data communication for delivery of the data communication to the third communication device.

9. The method of claim 1, wherein:

the cellular network is a 5G network;

the cellular base station is a gNodeB of the 5G network;

the network core is a 5G standalone (SA) core of the 5G network; and the UPF node is a user plane function (UPF) of the 5G network.

10. A system comprising:

a cellular network;

a network core located at a central site of the cellular network;

a cellular base station located at an edge site of the cellular network, the cellular base station configured to receive a data communication that is to be multicast from a first communication device and delivered to a second communication device in accordance with a set of parameters and to a third communication device in accordance with an additional set of parameters; and a set of user plane function (UPF) nodes deployed to the cellular network at a plurality of sites including the edge site and the central site, the set of UPF nodes including a particular UPF node configured to process the data communication in accordance with the set of parameters for delivery of the data communication to the second communication device, and an additional UPF node configured to process the data communication in accordance with the additional set of parameters for delivery of the data communication to the third communication device;

wherein the cellular network is configured to deliver, based on processing by the particular UPF node, the data communication from the first communication device to the second communication device in accordance with the set of parameters and to deliver, based on the processing by the additional UPF node, the data communication from the first communication device to the third communication device in accordance with the additional set of parameters.

11. The system of claim 10, wherein:

the first and second communication devices are direct transfer trip (DTT) controller devices deployed to a power grid;

the set of parameters indicates a latency tolerance parameter for the data communication; and the cellular network is configured to deliver the data communication in accordance with the set of parameters by delivering the data communication in accordance with the latency tolerance parameter.

12. The system of claim 11, wherein:

the second communication device is configured to direct an electric circuit to be deenergized in response to detection of an electrical fault on the electric circuit; and the data communication from the first communication device includes an indication that the electrical fault is detected on the electric circuit and an instruction to the second communication device to immediately direct the electric circuit to be deenergized.

13. The system of claim 10, wherein:

the cellular network includes a network slice that includes the second communication device to which the data communication is to be delivered; and the particular UPF node is selected from the set of UPF nodes, based on the network slice that includes the second communication device, to process the data communication.

14. The system of claim 10, wherein:

the set of parameters indicates that both the first and second communication devices are connected to the cellular base station and further indicates a latency tolerance parameter for the data communication; and the particular UPF node processes the data communication in accordance with the latency tolerance parameter by being deployed to the cellular base station at the edge site.

15. The system of claim 10, wherein:

the set of parameters indicates:

the first communication device is connected to the cellular base station, the second communication device is connected to an additional cellular base station communicatively coupled to the cellular base station by way of the network core, and a latency tolerance parameter for the data communication; and the particular UPF node processes the data communication in accordance with the latency tolerance parameter by being deployed to the additional cellular base station.

16. The system of claim 10, wherein:

the set of parameters indicates:

the first communication device is connected to the cellular base station, the second communication device is connected to an additional cellular base station communicatively coupled to the cellular base station by way of the network core, and a latency tolerance parameter for the data communication; and the particular UPF node processes the data communication in accordance with the latency tolerance parameter by being deployed to the network core.

17. The system of claim 10, wherein:

the cellular network includes:

a first network slice that includes the second communication device to which the data communication is to be delivered, and a second network slice that includes the third communication device to which the data communication is to be delivered;

the particular UPF node is selected from the set of UPF nodes, based on the first network slice that includes the second communication device, to perform the processing of the data communication for delivery of the data communication to the second communication device; and the additional UPF node is selected from the set of UPF nodes, based on the second network slice that includes the third communication device, to perform the processing of the data communication for delivery of the data communication to the third communication device.

18. A system comprising:

a 5G network;

a 5G standalone (SA) network core located at a central site of the 5G network;

an gNodeB located at an edge site of the 5G network, the gNodeB configured to receive a data communication that is to be multicast from a first communication device and delivered to a second communication device in accordance with a set of parameters and to a third communication device in accordance with an additional set of parameters; and a set of user plane functions (UPFs) deployed to the 5G network at a plurality of sites including the edge site and the central site, the set of UPFs including a particular UPF configured to process the data communication in accordance with the set of parameters for delivery of the data communication to the second communication device, and an additional UPF node configured to process the data communication in accordance with the additional set of parameters for delivery of the data communication to the third communication device;

wherein the 5G network is configured to deliver, based on processing by the particular UPF, the data communication from the first communication device to the second communication device in accordance with the set of parameters and to deliver, based on the processing by the additional UPF node, the data communication from the first communication device to the third communication device in accordance with the additional set of parameters.

19. The system of claim 18, wherein:

the first and second communication devices are direct transfer trip (DTT) controller devices deployed to a power grid;

the set of parameters indicates a latency tolerance parameter for the data communication; and the delivering of the data communication in accordance with the set of parameters includes delivering the data communication in accordance with the latency tolerance parameter.

20. The system of claim 18, wherein:

the set of parameters indicates that both the first and second communication devices are connected to the gNodeB and further indicates a latency tolerance parameter for the data communication; and the particular UPF node processes the data communication in accordance with the latency tolerance parameter by being deployed to the gNodeB at the edge site.

* * * * *